May 12, 1970 N. S. VAN BUREN 3,511,931
CONFERENCING NETWORKS EMPLOYING VIRTUAL GROUND SUMMATION
TO OBTAIN ISOLATION
Filed Feb. 2, 1966 3 Sheets-Sheet 1

INVENTOR.
NED S. VAN BUREN
BY
Stanley M. Schwarz
ATTORNEY

INVENTOR.
NED S. VAN BUREN
BY Stanley M. Schurgin
ATTORNEY

INVENTOR.
NED S. VAN BUREN
BY
Stanley M. Schwartz
ATTORNEY 3,511,931

CONFERENCING NETWORKS EMPLOYING VIRTUAL GROUND SUMMATION TO OBTAIN ISOLATION

Ned S. Van Buren, Belmont, Mass., assignor to Sylvania Electric Products Inc., a corporation of Delaware Filed Feb. 2, 1966, Ser. No. 524,579
Int. Cl. H04m *1/58, 9/00*
U.S. Cl. 179—1 5 Claims

ABSTRACT OF THE DISCLOSURE

A conferencing network employing for each party a separate channel having isolated input and output terminals. The input terminals of each channel are interconnected via a master operational amplifier which inverts the phase of an input signal to all the channels of the network. Also, each input terminal is connected directly to a virtual ground summation point at the input of a second operational amplifier in its respective channel. By proper phasing of the signals within the network, the channel having an input signal will have no signal at its output terminal thus eliminating echo signals in the network.

This invention relates generally to communication systems, and more particularly to an improved conferencing network for use in such systems.

Voice and data communication spstems, for example, telephone systems, often employ conferencing networks to provide interconnection of many parties at locations which may be widely separated. Such conferencing networks are becoming increasingly important in the communications market and must accommodate larger and larger numbers of conferees.

Most communication systems, such as telephone systems, are designed to provide connections between two parties with the echo and ringing controls adjusted to compensate for the path lengths which vary according to the locations of the parties. The sidetone is normally incorporated into the handsets of each party and is not dependent on the distance separating the parties. When a conference connection is to be established, that is, three or more parties interconnected, it is desirable, and perhaps mandatory, that the system stability and quality of performance not be adversely affected. In conventional conference networks, each conferee added to the circuit also adds a feedback loop to the circuit which results in relatively diminished isolation between conference channels and the input and output terminals of each conferee. To overcome the dininished system isolation, additional echo, ringing and sidetone control may be required to effect an acceptable conferencing connection.

Typical conference call networks, such as that illustrated in FIG. 1 of U.S. Pat. No. 3,210,476, provide conference connections through a number of four-port resistance bridges. Each of these bridges introduces about a 16 db loss into the system, thereby necessitating additional amplification to maintain proper signal levels. In addition, these bridges introduce multiple feedback loops into the system, causing instability in the echo, sidetone and ringing controls, which can result in connections of very poor quality. These resistive conferencing bridges also require extensive and complex switching controls to establish the conference connections, and are further limited in the number of parties which can be interconnected in a conference group.

Accordingly, it is an object of this invention to provide an improved centrally located conferencing network for a communications system which does not adversely affect its stability or quality of operation.

A further object of this invention is to provide a conferencing network which can be connected into a system by relatively simple switching operations.

Still another object of this invention is to provide a conferencing network capable of interconnecting large numbers of parties in a single conference group.

Briefly, the present invention provides a conferencing network which appears to each party to the conference as the second party to a two party call; that is, each party appears to be talking and listening to the conferencing network. Each party to the conference has a separate channel having isolated input and output terminals, and these terminals are connected via operational amplifiers to respective input and output terminals of the channels of the other conferees. Since good isolation is maintained, system stability is not affected by the conferencing network, and no additional echo, sidetone or ringing control is needed.

These operational amplifiers have a virtual ground at their summing point input and thereby provide adequate isolation between channels connected to this input.

The foregoing and other objects and advantages of the invention and a better understanding of its operation will become more readily apparent from the following detailed description, taken in conjunction with the accompanying drawings, in which.

Figure 1:
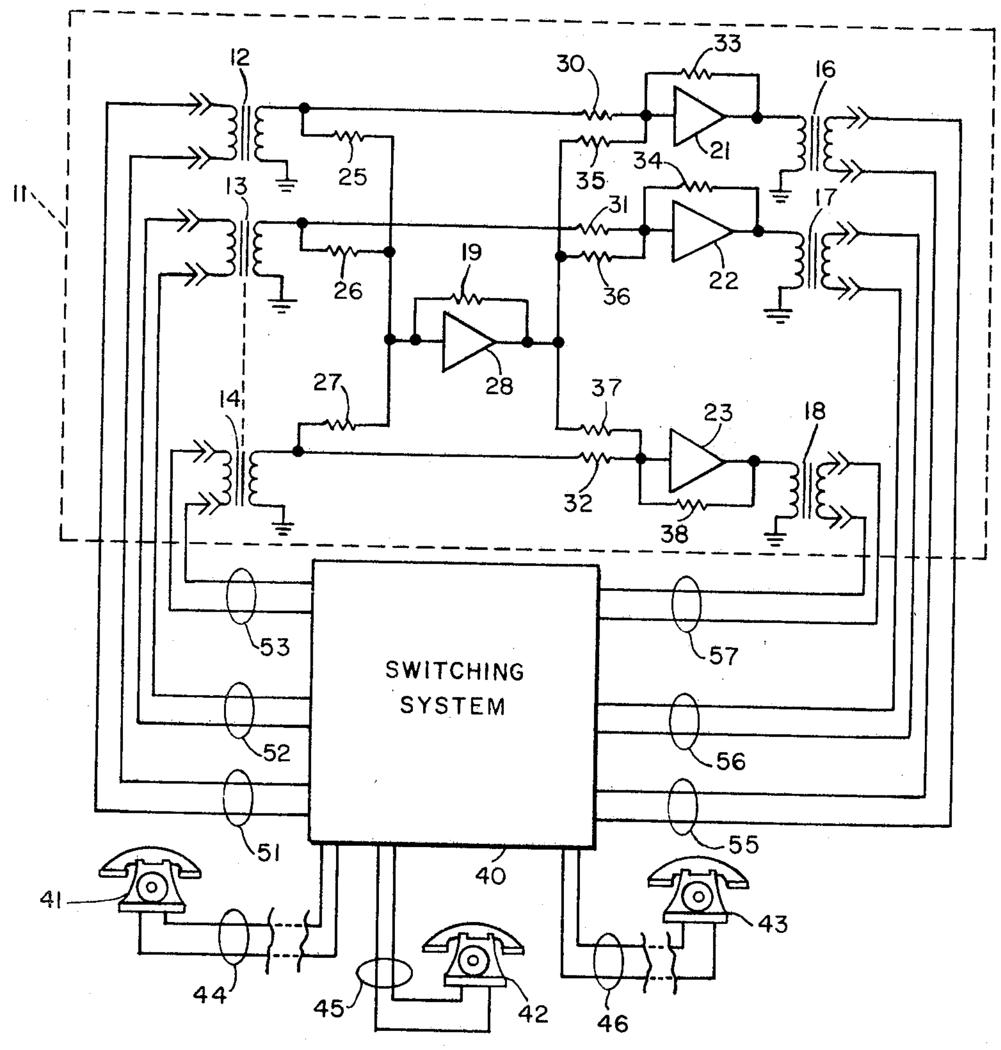
FIG. 1 is a partial schematic diagram of a conferencing network in a telephone system according to the invention.

Referring to FIG. 1, in the conferencing network 11 there are a number of input line transformers (12, 13, and 14 being shown), and a like number of output line transformers (16, 17 and 18 being shown). The primary winding of input line transformer and the secondary winding of an output line transformer provide the input and output connections to the conferencing network for each conference channel. The secondary winding of each input line transformer 12, 13 or 14 is connected on one side to a point of ground potential, with the other side of each winding connected via resistors 25, 26 and 27, respectively to the input terminal of a master operational amplifier 28. Resistors 30, 31 and 32 are connected between the secondary windings of line transformers 12, 13 and 14 and the input terminals of slave operational amplifiers 21, 22 and 23, respectively, the output terminals of which are connected to the primary windings of respective output line transformers 16, 17 and 18. Connections between the output of the master amplifier 28 and the inputs to the slave amplifiers 21, 22 and 23 are provided via resistors 35, 36 and 37, respectively. Feedback resistors 19, 33, 34 and 38 are connected, respectively, between the input and output terminals of the operational amplifiers 28, 21, 22 and 23.

As further illustrated in FIG. 1, three subscriber subsets 41, 42 and 43 are connected to the network 11 by means of the telephone switching system 40 to provide a three party conference connection. The transmission line groups 44, 45 and 46 from the subsets 41, 42 and 43, respectively, are connected into the switching system 40. If these transmission line groups represent four-wire line groups, then the transmit lines thereof are connected to the transmit line groups 51, 52 and 53 which are respectively connected across the primary windings of the input line transformers 12, 13 and 14. In similar fashion, the receive lines are connected to the receive line groups 55, 56 and 57 which are connected across the secondary windings of the output line transformers 16, 17 and 18, respectively. In the event that the transmission line groups 44, 45 and 46 represented two-wire transmission lines, then it would first be necessary to convert the two-wire system in the switching system to a four-wire trunk before connecting to the respective input and output line groups. While, only a three party conference connection is shown, it will be readily apparent that the system is expandable to accommodate larger numbers of conferees. Further, it is to be understood that the party conferees 41, 42 and 43 may be widely separated geographically from each other.

In operation, a first party, such as subscriber 41, requests via dial instructions or through an operator, that a conference be established with certain other parties, such as subscribers 42 and 43. To execute the request, subscriber 41 is connected by conventional means to the transmit and receive line groups 51 and 55, respectively, thereby terminating this party in the conference network 11 and, in similar fashion, subscribers 42 and 43 are connected via transmit line groups 52 and 53 and receive line groups 56 and 57, respectively, to the conferencing network 11.

Within the conferencing network 11, the voice signals from the input line transformers 12, 13 and 14 are applied via the resistors to the input terminal of the master operational amplifier 28. Assuming that this input terminal of the master amplifier is its inverting terminal, the output signal from the amplifier is inverted, and by having the feedback resistor 19 equal in value to resistors 25, 26 and 27, the amplifier acts as a gain of minus one device; that is, the gain of the operational amplifier is determined solely by the value of the input resistors and the feedback resistor. The output from master amplifier 28 is applied via resistors 35, 36 and 37 to the input terminals of the slave amplifiers 21, 22 and 23. At the same time, the voice signals from the input line transformers 12, 13 and 14 are applied via resistors 30, 31 and 32 to the respective input terminals of these slave amplifiers, these signals in all cases being non-inverted. With the resistors 30, 31 and 42 having the same resistance values as resistors 35, 36 and 37, respectively, the non-inverted voice signal from the line transformer of one channel cancels the inverted voice signal of that channel which is received at the input to the slave amplifier from the master amplifier. Therefore, any slave amplifier passes voice signals received from all other channels, but does not pass the voice signals received on its own channel, so that within available resistance tolerances, input and output terminals of each channel are isolated from one another.

A network as illustrated in FIG. 1 having the following circuit component values and commercial identities has been constructed and has the capability of providing twenty conference channels:

Line coils 12, 13, 14, 16, 17, 18—Peerless Electrical E204D Operational amplifiers 21, 22, 23, 28—Texas Instruments SN524

Resistors 19, 25, 26, 27, 30 thru 38—10K ohms.

The above circuit, utilizing one-percent resistors, provides 40 db isolation between the input and output terminals of each channel, and, when this circuit is switched into a communication system, it has a negligible effect on system stability and quality of operation.

While the circuit of FIG. 1 shows the line transformers as part of the conferencing network, it is readily apparent that in many applications they may be omitted. For example, in many telephone systems, line transformers are already available in switching system 40, so that the line transformers will not be required in the conferencing network. In still other applications, transformer coupling may be unnecessary or undersirable, so that direct connections may be made between the system and the conferencing network.

Figure 2:
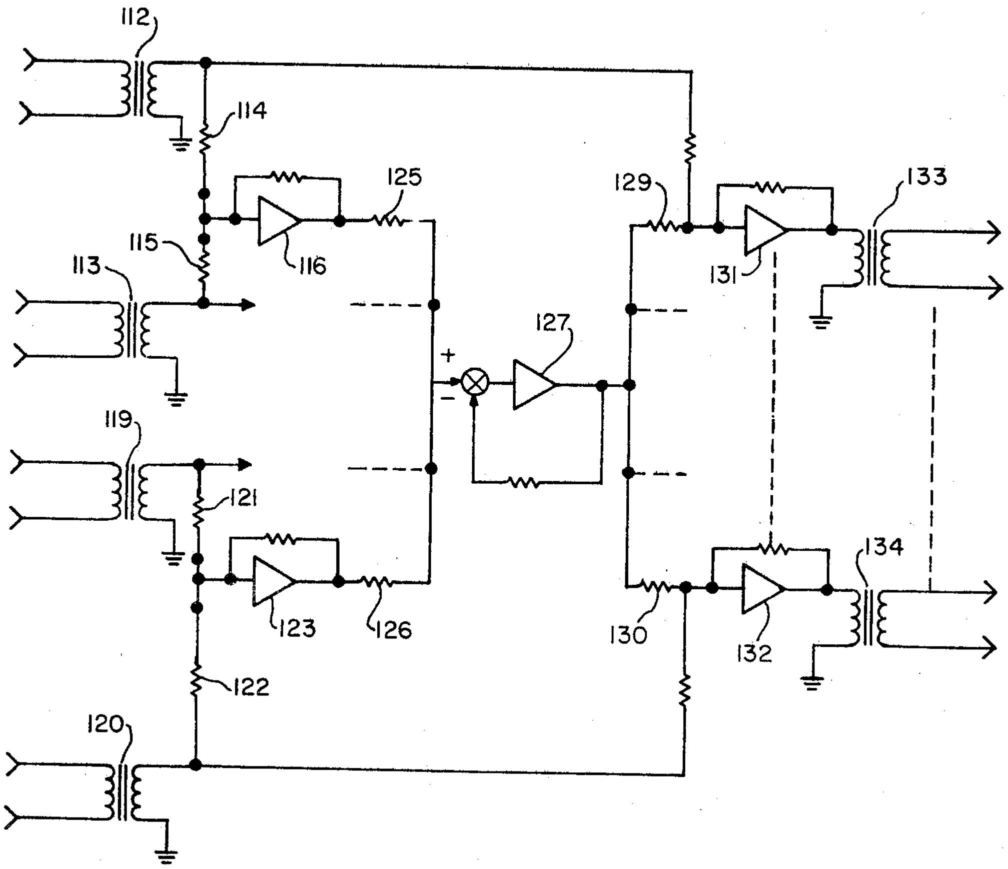
FIGS. 2 and 3 are partial schematic diagrams of alternate embodiments of conferencing networks according to the invention.

It is recognized that the number of conference connections available within a conferencing network will be limited by the power gain available from existing operational amplifiers. The circuit of FIG. 1, however, may be modified as illustrated in FIG. 2 to provide extended conferencing capability. In this embodiment, the connections between the input line transformers and the slave amplifiers associated with the output line transformers for each channel are the same as in the network of FIG. 1. However, the connections between the input line transformers and the master amplifier are different. Instead of connecting the secondary windings of each of the input line transformers to the input terminal of the same master amplifier, there are provided a number of such master amplifiers, each receiving inputs from a group of input line transformers. For example, the secondary windings of line transformers 112 and 113 are connected via resistors 114 and 115, respectively, to the input terminal of the master amplifier 116, and the secondary windings of the line transformers 119 and 120 are connected via the resistors 121 and 122, respectively, to the input of a master amplifier 123. The outputs from the master amplifiers 116 and 123 are applied via resistors 125 and 126, respectively, to the input terminal of a non-inverting summing operational amplifier 127. The output of amplifier 127 is then applied via resistors, such as 129 and 130, to the input of the slave amplifiers such as 131 and 132, associated with each of the output line transformers, for example 133 and 134. The non-inverting amplifier 127 and the additional master amplifiers provide sufficient gain to permit a larger number of conferees to be connected in a given conferencing network.

Figure 3:
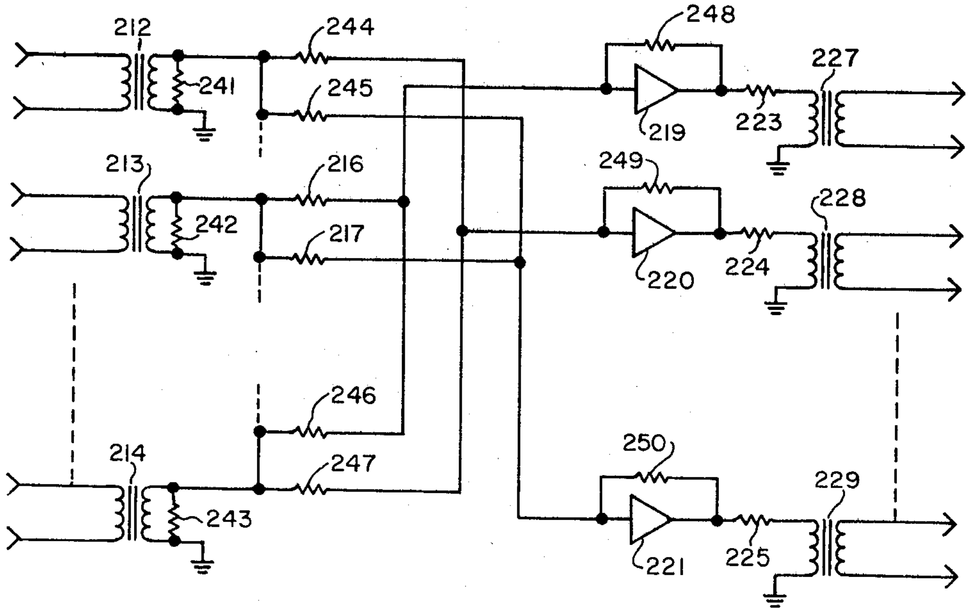

Referring next to FIG. 3, there is shown an alternate embodiment of a conferencing network according to the invention which does not require the use of master operational amplifiers. In this embodiment, the primary winding of each of the output line transformers 227, 228 and 229 is connected via respective resistors 223, 224 and 225 to the output terminal of respective operational amplifiers 219, 220 and 221. Each of the secondary windings of the input line transformers 212, 213 and 214 is connected via resistors to the input terminals of each of the operational amplifiers, except that no connection is made between the secondary winding of an input line transformer and the input terminal of the operational amplifier in the respective conference channel. For example, the secondary winding of the line transformer 212 is connected via resistors 244 and 245 to the input terminals of the operational amplifiers 220 and 221, but no connection is made between this line transformer and the input terminal of the operational amplifier 219. In addition, resistors 241, 242 and 243 are connected across the secondary windings of the line transformers 212, 213 and 214 to provide proper terminations when required. It is to be noted that similar resistors could also be utilized with the conferencing networks illustrated in FIGS. 1 and 2.

In the embodiment of FIG. 3, each operational amplifier driving an output line transformer serves as a summing amplifier for all inputs, except the input associated with its respective channel. As in the embodiments of FIGS. 1 and 2, these amplifiers may operate as either inverting or non-inverting devices, and when used as inverting amplifiers, the inversion may be compensated for by proper connection of the output line transformer windings. In the embodiment shown, where a resistor is connected between each amplifier and its output line transformer, it becomes necessary to overcome or compensate for the loss due to the drop across this resistor. For example, if the resistor 223 is a 600 ohm resistor to properly terminate the line transformer, the amplifier must have a gain of two. This is accomplished by making the feedback resistor 248 twice as large as the input resistors 216 and 246.

Figure 4:
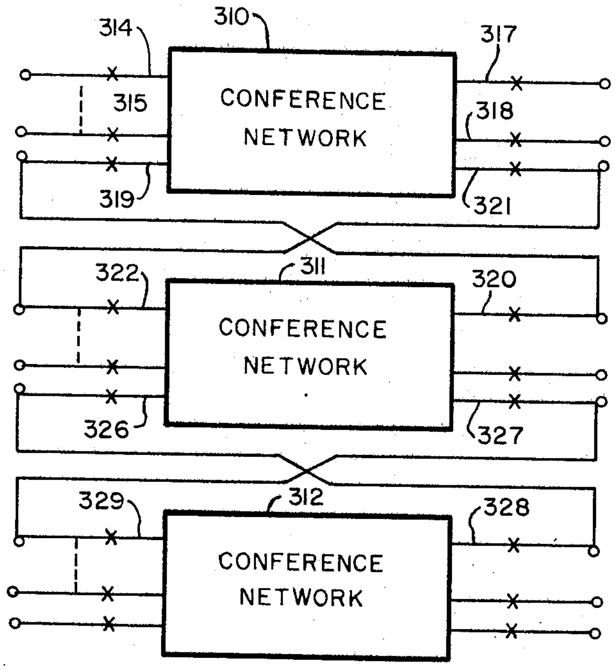
FIG. 4 is a block diagram illustrating the interconnection of a number of conferencing networks, as provided by the invention.

Although the above described conferencing networks may be constructed having twenty or more conference channels, it is recognized that the majority of conference requests require perhaps no more than eight conferees per conference. A particular advantage of this invention is that a number of smaller conferencing networks may be interconnected to provide a larger conferencing capability, thereby providing a more efficient implementation of a conferencing function in a system. Such a method of interconnection is illustrated in FIG. 4. Assume that each of the three conferencing networks 310, 311 and 312 contains eight conferencing channels and that it is desired to provide a twenty channel conference connection. One channel of each of the conferencing networks is connected to one channel of each of the other networks. For example, the eighth input line 319 of the conferencing network 310 is connecting to the first output line 320 of the conference network 311, and the eighth output line 321 of the network 310 is connected to the first input line 322 of the network 311. In similar fashion, the eighth input and output lines 326 and 327 of the network 311 are connected, respectively, to the first output and input lines 328 and 329 of the network 312. The twenty party conferees are connected to the first seven channels of the network 310, the second through seventh channels of the network 311 and the second through eighth channels of the network 312. While the above described connection may be affected within the system to provide twenty conference channels, if eight or fewer channels are required in a conference, they can be provided by a single conferencing network, leaving the other networks free to handle other conference requests.

While the foregoing is illustrative of specific embodiments and applications of the invention, it will be apparent to those skilled in the art that many modifications and variations may be made without departing from the true spirit of the invention. For example, in the networks of FIG. 1 and FIG. 2 it may be desirable to place termination resistors across the secondary windings of the input line transformers as shown in the circuit of FIG. 3, and in some instances it may also be desirable to place the termination resistors between the output terminals of the slave amplifiers and the primary windings of the output line transformers, again as illustrated in the circuit of FIG. 3. Furthermore, while the invention has been shown as being particularly applicable to provide conferencing capability in a telephone system, it will find diversified application in other areas, for example, data transmission systems, or networks which are selectively interconnected. It is, therefore, intended that the invention not be limited to the specifics of the foregoing description, but is rather to embrace the full scope of the following claims.

What is claimed is:

1. A conferencing network comprising:

a source of reference potential;

a multiplicity of conferencing channels; each of said channels including at least one input terminal adapted to receive input signals and at least one output terminal adapted to transmit signals, an amplifier means having input and output terminals, means connecting the output terminal of said amplifier means to the output terminal of said conferencing channel, and means connected to the input terminal of said amplifier means for maintaining the input terminal of said amplifier means at virtually zero potential relative to said source of reference potential; and means connecting the input terminal of each of said channels to only the input terminals of the amplifier means in the other conferencing channels, whereby each amplifier means is adapted to receive input signals from all input terminals of said channels except the input signal from the input terminal of its respective channel.

2. The invention according to claim 1, wherein said means connecting the input terminal in each of said channels to only the input terminals of the amplifier means in the other conferencing channels comprises for each of said channels;

a plurality of resistors, each of said resistors being connected between the input terminal of said amplifier means and an input terminal in one of said other conferencing channels.

3. The invention according to claim 1, wherein for each channel said means connecting the output terminal of said amplifier means to the output terminal of said conferencing channel comprises a resistor connected between the output terminal of said amplifier means and the output terminal of said conferencing channel.

4. A conferencing network comprising:

a source of reference potential;

a multiplicity of conferencing channels, each of said channels including an input terminal, an output terminal, an amplifier means having an input terminal and an output terminal, the output terminal of said amplifier means being connected to the output terminal of said conferencing channel, means for maintaining the input terminal of said amplifier means at virtually zero potential relative to said source of reference potential, means for connecting the input terminal of said conferencing channel to the input terminal of said amplifier means; and means connected between the input terminal of each of said conferencing channels and the input terminal of each of said amplifiers for inverting an input signal whereby an input signal is cancelled at the input to only the operational amplifier of the conferencing channel in which the input signal originated, wherein said means for inverting comprises:

a master amplifier having first and second terminals with feedback means connected therebetween;

a plurality of amplifier means each having input and output terminals and feedback means connected between its input and output terminals;

a plurality of connecting means each connecting the input terminal in a pair of said conferencing channels to the input terminal of one of said plurality of amplifier means;

means connecting the output terminal of each of said plurality of amplifier means to the input terminal of said master amplifier; and means connecting the output terminal of said master amplifier to the input terminal of each amplifier means in each of said conferencing channels.

5. A conferencing network comprising:

a multiplicity of conferencing channels; each of said channels comprising at least one input terminal adapted to receive input signals, at least one output terminal adapted to transmit signals, input and output transformers having primary and secondary windings, means connecting the input terminal of said channel to the primary winding of said input transformer, means connecting said output terminal of said channel to the secondary winding of said output transformer, an amplifier means having input and output terminals, feedback means connected between the input and output terminals of said amplifier means for maintaining the input terminal of said amplifier means at virtually zero potential relative to said source of reference potential, means connecting the secondary winding of said input transformer to the input terminal of said amplifier means, and means connecting the output terminal of said amplifier means to the primary winding of said output transformer; and means connected between the secondary winding of the input transformer in each of said channels and the input terminal of each amplifier means in each of the conferencing channels for inverting the input signals, wherein said means connected between the secondary winding of the input transformer in each of said channels and the input terminal of each amplifier means in each of the conferencing channels for inverting the input signals comprises:

a master amplifier having input and output terminals with feedback means connected between its input and output terminals;

a plurality of amplifier means each having input and output terminals and each having a feedback means connected between its input and output terminals;

a plurality of connecting means, each connecting the secondary windings of the input transformers in a pair of said channels to the input terminal of one of said plurality of amplifier means;

means connecting the output terminal of each of said plurality of amplifier means to the input terminal of said master amplifier; and means connecting the output terminal of said master amplifier to the input terminal of each amplifier means in each of said conferencing channels.

References Cited

UNITED STATES PATENTS

| | | | |
|---|---|---|---|
| 2,035,536 | 3/1936 | Cowan et al. | 179—18 |
| 3,060,265 | 10/1962 | Duncan et al. | 179—1 |
| 3,399,275 | 8/1968 | Niertit et al. | 179—1 |

FOREIGN PATENTS

| | | |
|---|---|---|
| 602,932 | 8/1960 | Canada. |

KATHLEEN H. CLAFFY, Primary Examiner

A. B. KIMBALL, Jr., Assistant Examiner

U.S. Cl. X.R.

179—18